US012039194B2

(12) United States Patent
Li et al.

(10) Patent No.: US 12,039,194 B2
(45) Date of Patent: Jul. 16, 2024

(54) UNMAP BACKLOG IN A MEMORY SYSTEM

(71) Applicant: Micron Technology, Inc., Boise, ID (US)

(72) Inventors: Huachen Li, Shanghai (CN); Xu Zhang, Shanghai (CN); Xing Wang, Shanghai (CN); Guan Zhong Wang, Shanghai (CN); Tian Liang, Shanghai (CN); Junjun Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/050,334

(22) PCT Filed: Aug. 25, 2020

(86) PCT No.: PCT/CN2020/111079
§ 371 (c)(1),
(2) Date: Oct. 23, 2020

(87) PCT Pub. No.: WO2022/040914
PCT Pub. Date: Mar. 3, 2022

(65) Prior Publication Data
US 2023/0342077 A1    Oct. 26, 2023

(51) Int. Cl.
*G06F 3/06* (2006.01)
(52) U.S. Cl.
CPC .......... *G06F 3/0659* (2013.01); *G06F 3/0607* (2013.01); *G06F 3/0658* (2013.01); *G06F 3/0688* (2013.01)
(58) Field of Classification Search
CPC .... G06F 3/0659; G06F 3/0607; G06F 3/0658; G06F 3/0688
See application file for complete search history.

(56) References Cited

U.S. PATENT DOCUMENTS

2005/0207407 A1* 9/2005 Baumberger ......... H04L 49/901
370/389
2011/0231594 A1* 9/2011 Sugimoto ............. G06F 3/0688
711/E12.008

(Continued)

FOREIGN PATENT DOCUMENTS

CN    104679668 A    6/2015
CN    108304139 A    7/2018

(Continued)

OTHER PUBLICATIONS

ISA/CN, "International Search Report and Written Opinion of the International Searching Authority," issued in connection with Int'l Appl. No. PCT/CN2020/111079, dated May 24, 2021 (10 pages).

*Primary Examiner* — Hiep T Nguyen
(74) *Attorney, Agent, or Firm* — Holland & Hart LLP

(57) ABSTRACT

Methods, systems, and devices for unmap backlog in a memory system are described. A memory system may be configured to support receiving an unmap command from a host system and signaling, to the host system, an indication that the unmap command has been processed (e.g., handled, acknowledged). In response to the unmap command, the memory system may proceed with various unmap operations, which may include unmapping at least some of the associated addresses after indicating that the unmap command has been processed. For example, a memory system may implement an unmap backlog table to identify sections of addresses that are to be unmapped (e.g., after indicating that the unmap command has been processed). In some examples, the memory system may support various aspects of prioritization between unmap operations (e.g., background unmap operations) and other access operations such as read operations, write operations, or other access operations.

25 Claims, 5 Drawing Sheets

(56) References Cited

U.S. PATENT DOCUMENTS

| | | | |
|---|---|---|---|
| 2018/0024779 A1* | 1/2018 | Kojima | G06F 12/0246 |
| | | | 711/103 |
| 2019/0087113 A1 | 3/2019 | Isozaki et al. | |
| 2021/0073078 A1* | 3/2021 | Cho | G06F 12/0882 |
| 2021/0103518 A1* | 4/2021 | Ju | G06F 9/3885 |

FOREIGN PATENT DOCUMENTS

| | | |
|---|---|---|
| CN | 110175133 A | 8/2019 |
| CN | 110825316 A | 2/2020 |
| CN | 111414313 A | 7/2020 |

* cited by examiner

UNMAP BACKLOG IN A MEMORY SYSTEM

CROSS REFERENCE

The present Application for Patent is a 371 national phase filing of International Patent Application No. PCT/CN2020/111079 by LI et al., entitled "UNMAP BACKLOG IN A MEMORY SYSTEM," filed Aug. 25, 2020, assigned to the assignee hereof, and expressly incorporated by reference herein.

BACKGROUND

The following relates generally to one or more memory systems and more specifically to unmap backlog in a memory system.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
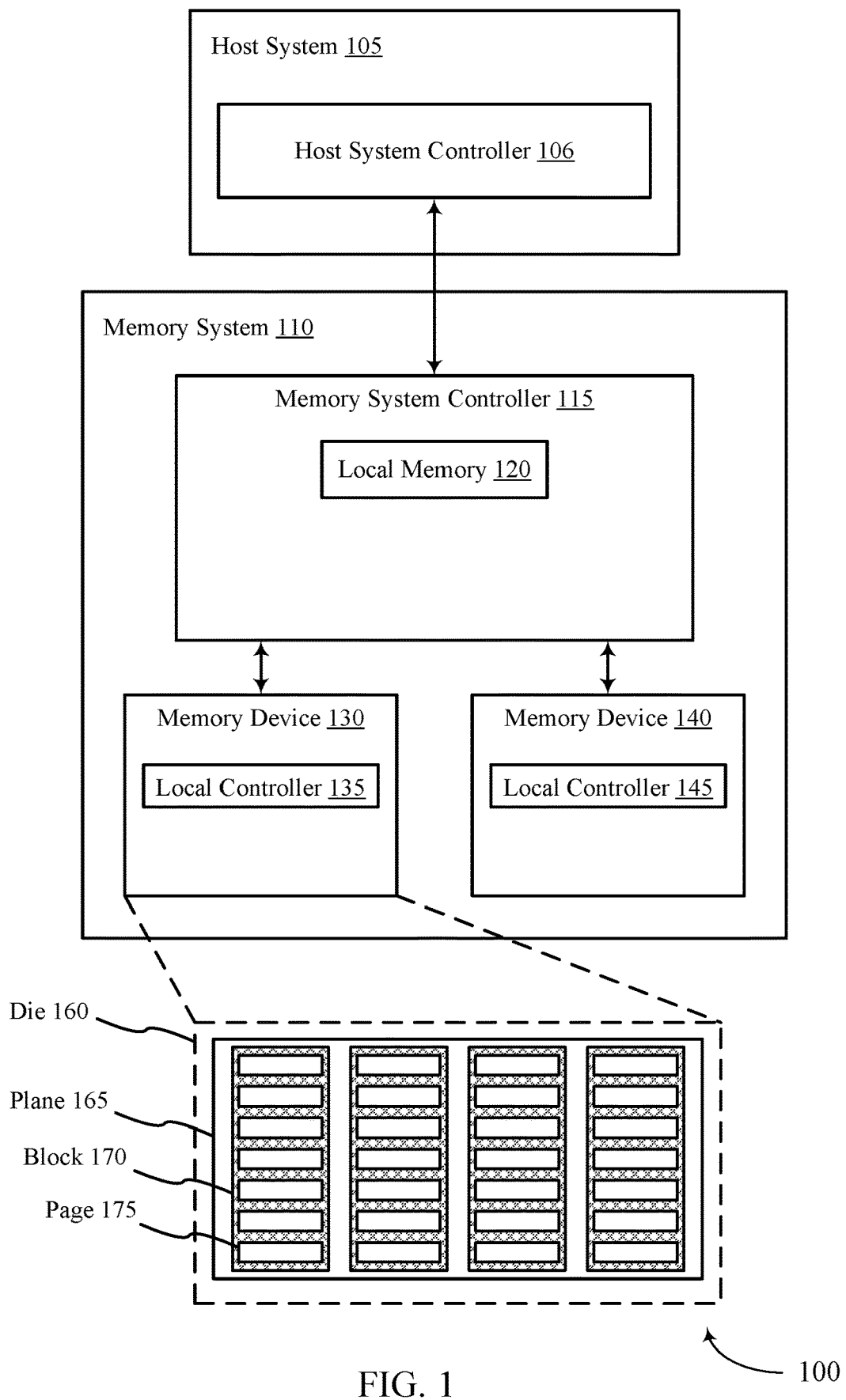
FIG. 1 illustrates an example of a system that supports unmap backlog in a memory system in accordance with examples as disclosed herein.

Memory systems, including flash memory systems and other types of memory systems, may use various techniques for mapping data to physical locations of associated memory cells. In some examples, a memory system may support such mapping using one or more logical-to-physical (L2P) tables, which may provide a relationship between logical addresses (e.g., for communicating addresses between the memory system and a host system) and physical addresses corresponding to locations of memory cells in one or more memory arrays of the memory system (e.g., according to dies, planes, blocks, pages, rows, or columns of memory cells, or other physical constructs of memory cell organization). When data stored in a memory cell is no longer needed, or when a memory cell may otherwise be deallocated or erased (e.g., in response to a command from a host device), a memory system may perform an unmap operation, which may clear one or more entries of an L2P table, among other operations. In some cases, however, an unmap operation may be associated with a delay of other operations of the memory system, or other operations of a host system coupled with the memory system, which may be scaled with or otherwise related to a size of an unmap operation (e.g., a range of addresses of the memory system to be unmapped).

In accordance with examples as disclosed herein, a memory system may be configured to support receiving an unmap command from a host system and signaling, to the host system, an indication that the unmap command has been processed (e.g., that the unmap command has been handled, that the command to unmap addresses is acknowledged, or that the host system may otherwise proceed with other operations or commands). In response to the unmap command, the memory system may perform various unmap operations, which may include unmapping at least a portion of a range of addresses of the unmap command after signaling the indication to the host system that the unmap command has been processed. For example, a memory system may implement an unmap backlog table to identify sections of addresses that are to be unmapped, and to manage ongoing unmap operations (e.g., as a background operation of the memory system) after indicating or otherwise acknowledging that the unmap command has been processed. By acknowledging an unmap command and performing unmap operations after such an acknowledgement, a memory system may support performing larger unmap operations (e.g., spanning a larger range of addresses) without incurring undue latency, and may support various aspects of prioritization between unmap operations and other access operations such as read or write operations (e.g., in response to commands from the host device) or other access operations (e.g., memory management operations performed within the memory system).

Features of the disclosure are initially described in the context of a memory system and associated unmap backlog operations as described with reference to FIGS. 1 through 3. These and other features of the disclosure are further illustrated by and described with reference to an apparatus diagram and flowchart that relate to unmap backlog in a memory system as described with reference to FIGS. 4 and 5.

FIG. 1 is an example of a system 100 that supports unmap backlog in a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB)

flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions)

executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables may be maintained and data or addresses may be marked as valid (e.g., mapped, allocated) or invalid (e.g., unmapped, deallocated) at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The system 100 may include any quantity of non-transitory computer readable media that support unmap backlog in a memory system. For example, the memory system controller 115, a memory device 130, or a memory device 140 may include or otherwise may access one or more non-transitory computer readable media storing instructions (e.g., firmware) for performing the functions ascribed herein to the memory system controller 115, memory device 130, or memory device 140. For example, such instructions, when executed by the memory system controller 115, by a memory device 130 (e.g., by a local controller 135), or by a memory device 140 (e.g., by a local controller 145), may cause the memory system controller 115, memory device 130, or memory device 140 to perform one or more associated functions as described herein.

In some examples, a host system 105 or memory system 110 may determine that data of one or more pages 175 of a memory device 130 is no longer needed, is no longer valid, is to be replaced with different data, or that associated memory cells are to be erased, deallocated, or otherwise made available for different data. In such examples, the entries of an L2P table corresponding to such pages 175 may be updated with an indication that data of the pages 175 (e.g., of related logical or physical addresses) is invalid. Such updating of an L2P table may include or be referred to as an unmap operation and may, in some examples, be performed in response to a command from the host system 105 (e.g., in response to an unmap command). When all of the pages 175 of a block 170 are indicated as being invalid (e.g., according to indications of an L2P table or otherwise), the memory system 110 may proceed with erasing the memory cells of the block 170.

In some examples, a duration for performing an unmap operation may be associated with a quantity of addresses to be unmapped in the unmap operation (e.g., a quantity of logical addresses of the memory system 110 or memory device 130, a quantity of pages 175 associated with the unmap operation). For example, each entry of an L2P table associated with a range of addresses of an unmap operation may be written with a different value (e.g., an indication of invalidity), which may involve a duration associated with performing one or more write operations (e.g., writing memory cells that store the indication of invalidity of the L2P table entries). Moreover, in some examples, such entries may be loaded or transferred from one storage location of a memory system 110 to another location before such writing or updating of L2P entries is performed. For example, an L2P table may be stored in a non-volatile storage of a memory system 110 (e.g., to support data integrity in the event of power loss), but entries may be manipulated in a different storage architecture that may have various degrees of volatility or non-volatility (e.g., to support lower-latency operations, to support more power-efficient operations). In one example, to support an unmap operation, an L2P table may be stored in NAND memory cells (e.g., of a memory device 130), and at least a portion of the L2P table may be transferred to SRAM memory cells (e.g., of a local memory 120, a local memory or memory device) or DRAM memory cells (e.g., of a memory device 140) before the entries of the L2P table are updated with an indication that data of one or more pages 175 is invalid (e.g., being updated in the SRAM or DRAM storage location). After such updating, L2P table entries may be returned or copied to NAND memory cells for non-volatile storage. Thus, in some examples, unmap operations may also involve one or more durations associated with transferring entries of an L2P table from one storage location of a memory system 110 to another location.

In some examples of the system 100, the host system 105 may be configured to issue an unmap command to the memory system 110, and the memory system 110 may be configured to issue or indicate a response when the memory system 110 has fully updated all of the entries of an L2P table that are associated with the range of addresses of the unmap command. In some examples, the host system 105 may await such a response for a threshold duration, which may include suspending other operations with or commands to the memory system 110. Thus, in some examples, unmap operations may involve access latency or other performance degradation of the system 100 (e.g., a duration during which other access operations may not be supported). Further, in some examples, if the host system 105 does not receive an unmap response within the threshold duration, the host system 105 may assume or infer an error condition of the memory system 110, such as an Application No Response (ANR) failure. In some cases, however, the memory system 110 may still be actively performing unmap operations, such as operations responsive to a relatively large unmap command (e.g., when there is a mismatch between an allowed range of addresses for an unmap command and a threshold duration for performing the related unmap operations). Accordingly, for these and other reasons, relatively long durations between an unmap command and a response that unmap operations have been completed, including those related to relatively large unmap commands, may impair performance of the system 100, or may result in a memory system 110 failing to satisfy a design or qualification parameter.

In accordance with examples as disclosed herein, a memory system 110 may be configured to support receiving an unmap command from a host system 105 and signaling, to the host system 105, an indication that the unmap command has been processed (e.g., an unmap response). In various examples, such an indication may include or be otherwise interpreted as an indication that the unmap command has been handled, that the unmap command is acknowledged, that the memory system 110 is available for access by the host system 105 (e.g., for further access operations), that at least the range of addresses of the unmap command is available for access by the host system 105, that the unmap operation is being performed in a background operation, or that the host system 105 may otherwise proceed with other operations or commands, among other indications or interpretations. In response to the unmap command, the memory system 110 may proceed with various unmap operations, which may include unmapping at least a portion of a range of addresses of the unmap command after signaling the indication to the host system 105 that the unmap command has been processed (e.g., where firmware of the memory system 110 may continue to process an unmap backlog after indicating an unmap response). In some examples, to support such techniques, the memory system 110 may implement an unmap backlog table to identify sections of addresses that are to be unmapped, and to manage ongoing unmap operations after indicating or otherwise acknowledging that an unmap command has been processed. By supporting at least some unmap operations being performed after acknowledging an unmap command, the memory system 110 may support performing larger unmap operations without incurring undue latency, or may support various aspects of prioritization between unmap operations and other access operations such as read or write operations (e.g., in response to commands from the host system 105) or other access operations (e.g., memory management operations performed within the memory system 110), among other benefits.

Figure 2:
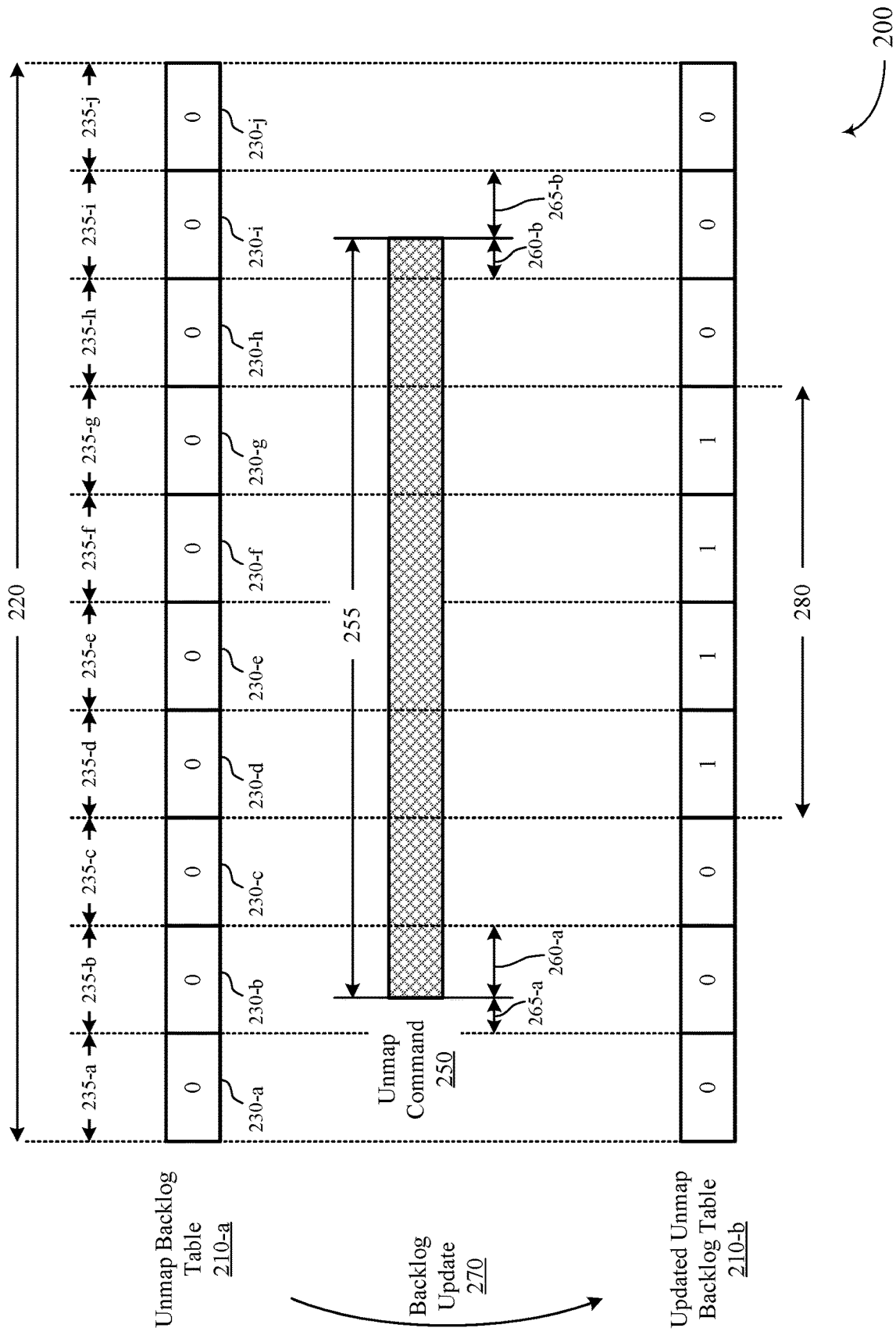
FIG. 2 illustrates an example of an unmap backlog table operation that supports unmap backlog in a memory system in accordance with examples as disclosed herein.

FIG. 2 illustrates an example of an unmap backlog table operation 200 that supports unmap backlog in a memory system in accordance with examples as disclosed herein. The unmap backlog table operation 200 may be performed by a memory system 110, and illustrates an example of an unmap backlog table 210 that may be updated (e.g., in a backlog update 270) in response to an unmap command 250.

The unmap backlog table 210 may be associated with an address range 220 of the memory system 110, such as a range of logical or physical addresses of the memory system 110, or a memory device 130 thereof, as described with reference to FIG. 1. In various examples, a memory system 110 may operate with a single unmap backlog table 210 (e.g., with an address range 220 of one unmap backlog table 210 corresponding to all the addresses of the memory system 110) or multiple unmap backlog tables 210 (e.g., each corresponding to a respective address range 220, with one or more unmap backlog tables 210 being assigned to each of one or more memory devices 130 of the memory system 110). The unmap backlog table 210 may include a plurality of fields 230 that are each associated with a respective section of addresses 235 (e.g., a respective portion or subset of an address range 220). A value of 1 in a field 230 may indicate that the corresponding section of addresses 235 is included in an unmap backlog of the memory system 110 (e.g., that addresses of the section of addresses 235 are awaiting an unmap operation, that entries of an L2P table corresponding to the section of addresses 235 are to be marked as invalid), and a value of 0 in a field 230 may indicate that the corresponding section of addresses 235 is not included in an unmap backlog of the memory system 110 (e.g., that addresses of the section of addresses 235 are not awaiting an unmap operation).

Each section of addresses 235 may refer to a plurality of pages 175 of a memory die 160, or be otherwise associated with some plurality of other divisions of an L2P table. In one example, each page 175 or entry of an L2P table may be associated with a 4 KB address range or set of memory cells, and each section of addresses 235 or field 230 of the unmap backlog table 210 may be associated with a 128 MB address range or set of memory cells. Thus, according to these and other examples, an L2P table may be an example of a first lookup resource for data validity or invalidity according to a first granularity (e.g., a relatively fine granularity, an LBA-level granularity), and the unmap backlog table 210 may be an example of a second lookup resource for data validity or invalidity according to a second granularity (e.g., a relatively coarse granularity). In some examples, a value of 1 in a field 230 of an unmap backlog table 210 may be interpreted as an indication that data of the corresponding section of addresses 235 is invalid or deallocated, regardless of whether one or more associated entries of an L2P table indicate valid or invalid data (e.g., where an indication of a field 230 may supersede corresponding entries of an L2P table, due to the possibility of associated unmap operations being incomplete or not yet performed). In some examples, a value of 0 in a field 230 may be interpreted as an indeterminate indication of data validity or invalidity, in which case such information may be retrieved from an L2P table (e.g., ignoring an unmap backlog table 210 with regards to a determination of data validity or invalidity).

In the example of unmap backlog table operation 200, the memory system 110 may begin with a cleared unmap backlog, as indicated by the value of 0 in each field 230 of the unmap backlog table 210-a. The memory system 110 may receive (e.g., from a host system 105) an unmap command 250 associated with a range of addresses 255 to be unmapped (e.g., some or all of the address range 220). In response to receiving the unmap command 250, the memory system 110 may perform a backlog update 270 to update fields 230 to values as shown in the updated unmap backlog table 210-b. In some examples, the backlog update 270 may include setting one or more of the fields 230 of the unmap backlog table 210, associated with at least a portion of the range of addresses 255, with a backlog indication, such as setting a field 230 with a value of 1. Based at least in part on performing the backlog update 270, the memory system 110 may signal a responsive indication that the unmap command 250 has been processed (e.g., as an unmap response following the backlog update 270). The memory system 110 may proceed with unmapping the range of addresses 255, which may include unmapping at least a portion of the range of addresses 255 (e.g., corresponding to sections of addresses 235 having a value of 1 in a corresponding field 230 of the updated unmap backlog table 210-b, an address range 280) after signaling the indication that the unmap command 250 has been processed.

In some examples, the memory system 110 may be configured to unmap a head or tail portion of the range of addresses 255 before performing a backlog update 270 or before indicating that the unmap command 250 has been processed. A head or tail portion may refer to a portion of the beginning or end of the range of addresses 255, and may include at least a section of addresses 235 that has some portion that is included in the range of addresses 255 and some portion that is not included in the range of addresses 255. For example, referring to a head portion, the section of addresses 235-b may include a first portion 260-a corresponding to addresses of the section of addresses 235-b that are included in or overlapping with the range of addresses 255, and a second portion 265-a corresponding to addresses of the section of addresses 235-b that are not included in or overlapping with the range of addresses 255. In some examples, in response to the unmap command 250, the memory system 110 may identify the section of addresses 235-b as including a head portion, and unmap the addresses of the first portion 260-a before performing a backlog update 270 or before indicating that the unmap command 250 has been processed (e.g., so that validity or invalidity information can be maintained by the unmap backlog table 210 at a granularity of the sections of addresses 235). In another example, referring to a tail portion, the section of addresses 235-i may include a first portion 260-b corresponding to addresses of the section of addresses 235-i that are included in or overlapping with the range of addresses 255, and a second portion 265-b corresponding to addresses of the section of addresses 235-i that are not included in or overlapping with the range of addresses 255. In some examples, in response to the unmap command 250, the memory system 110 may identify the section of addresses 235-i as including a tail portion, and unmap the addresses of the first portion 260-b before performing a backlog update 270 or before indicating that the unmap command 250 has been processed.

In some examples, performing unmap operations before performing a backlog update 270, or before indicating that the unmap command 250 has been processed, may be based at least in part on a threshold size of an unmap command 250 (e.g., a threshold size of a range of addresses 255), or a threshold size of a head portion or a tail portion of an unmap command 250. For example, the memory system 110 may process a head portion or a tail portion associated with an address range or set of memory cells that is less than 256 MB, which may span an integer quantity of one or more sections of addresses 235. In one example, the memory system 110 may divide the range of addresses 255 of an unmap command 250 into three portions: a head portion having a corresponding size that is less than 256 MB and greater than or equal to 128 MB, a body portion that may be aligned with an integer multiple of sections of addresses 235, and a tail portion having a corresponding size that is less than 256 MB and greater than or equal to 128 MB. In some examples, the memory system 110 may perform unmapping operations for a head portion and a tail portion before issuing an unmap response, and may process a body portion after issuing an unmap response (e.g., logging a value of 1 in corresponding fields 230 of the unmap backlog table 210).

In an illustrative example, when each of the sections of addresses 235 are associated with a 128 MB address range or set of memory cells, the memory system 110 may identify a head portion as including the first portion 260-a and the entirety of the section of addresses 235-c, and identify a tail portion as including the first portion 260-b and the entirety of the section of addresses 235-h (e.g., where the head and tail portions may each be between 128 MB and 256 MB in associated size). The memory system 110 may perform the unmapping of the identified head portion and the identified tail portion before issuing an unmap response. Accordingly, as illustrated in the example of unmap backlog table operation 200, the backlog update 270 may include assigning a value of 1 to each of the fields 230-d, 230-e, 230-f, and 230-g, which may be associated with an identified body portion of the unmap command 250 (e.g., an address range 280 of addresses to be unmapped after indicating an unmap response). After indicating an unmap response, the memory system 110 may unmap the sections of addresses 235-d, 235-e, 235-f, and 235-g according to various patterns, and when such a section of addresses 235 has been unmapped (e.g., indicating invalid data in the corresponding entries of an L2P table), the memory system 110 may clear the backlog indication of the corresponding field 230 (e.g., writing the field 230 with a value of 0). In the event that a range of addresses 255 of an unmap command 250 is less than a threshold size, such as less than 512 MB, the memory system 110 may unmap the entirety of the range of addresses 255 before indicating an unmap response, which may include omitting a backlog update 270 (e.g., because no sections of addresses 235 may be awaiting unmap operations).

In some examples, a memory system 110 may consider entries of the unmap backlog table 210 when receiving subsequent commands from a host system 105 or performing other memory management techniques. For example, the memory system 110 may be performing background unmap operations, and may suspend or prioritize the background unmap operations, or may determine various responses to commands, depending on a particular operation to be performed. Thus, an unmap backlog table 210 may support various techniques for operational flexibility or optimization that may improve the performance of the associated system.

In one example, the memory system 110 may consider an unmap backlog table 210 when a read command is received. For example, if the unmap backlog table 210 includes any backlog indications (e.g., fields 230 having a value of 1), the memory system 110 may determine whether an address of a received read command is included in a section of addresses 235 having a backlog indication in the corresponding field 230. If so, (e.g., if the read command includes an address associated with the sections of addresses 235-d, 235-e, 235-f, or 235-g of the updated unmap backlog table 210-b), the memory system 110 may respond with a null or empty information response, a "return zero" response (e.g., all zeros), or some other pattern indicating that the address of the read command has been deallocated (e.g., indicating that the data of the address is invalid). Such a response may be signaled regardless of a data validity or invalidity indication of an L2P table, since unmap operations (e.g., in response to a preceding unmap command 250) may not have been performed to update such entries of the L2P table. Thus, in some examples, such a response may be indicated without reading an L2P table or otherwise accessing an associated memory device 130.

In another example, the memory system 110 may consider an unmap backlog table 210 when a write command is received. For example, if the unmap backlog table 210 includes any backlog indications, the memory system 110 may determine whether an address of a received write command is included in a section of addresses 235 having a backlog indication in the corresponding field 230. If so, (e.g., if the write command includes an address associated with the sections of addresses 235-*d*, 235-*e*, 235-*f*, or 235-*g* of updated unmap backlog table 210-*b*), the memory system 110 may prioritize unmapping such an identified section of addresses 235, which may include performing the associated unmap operations before performing write operations in response to the received write command.

In another example, the memory system 110 may consider an unmap backlog table 210 when another unmap command 250 is received. If the unmap backlog table 210 includes any backlog indications, the memory system 110 may support merging a range of addresses 255 of the second unmap command 250 with the fields 230 of the unmap backlog table 210. If a second unmap command 250 is received before an unmap response was indicated to the host system 105, for example, the merging may include merging a head or tail portion of the range of addresses 255 of the first unmap command 250 with an adjacent portion of the range of addresses 255 of the second unmap command 250. Referring to the example of unmap backlog table operation 200, if a second unmap command 250 includes the second portion 265-*a* of the section of addresses 235-*b*, the unmap backlog table 210 may be updated with a backlog indication for the field 230-*b* (e.g., a value of 1), and the memory system 110 may proceed with performing unmap operations on a head portion of the second unmap command 250 before indicating an unmap response to the host system 105. The memory system 110 may subsequently indicate an unmap response to one or both of the first unmap command 250 or the second unmap command 250. In another example, if a head or tail portion of a second unmap command 250 is aligned with or overlaps a section of addresses 235 that already includes a backlog indication in the unmap backlog table 210, the memory system 110 may maintain the backlog indication (e.g., and not perform the unmapping of the head or tail portion prior to indicating an unmap response to the second unmap command 250), or the memory system 110 may proceed with performing the unmap operations on the entire section of addresses 235 associated with the head or tail portion of the second unmap command 250.

In another example, the memory system 110 may consider an unmap backlog table 210 when performing erase operations or other memory management operations. For example, if a set of one or more sections of addresses 235 that are associated with a full block 170 of a memory die 160 are marked with a backlog indication (e.g., a value of 1), the memory system 110 may mark such a block 170 for erasure regardless of the entries of an L2P table, which may support erasure of such a block 170 before or concurrently with unmapping operations performed on the L2P table.

Figure 3:
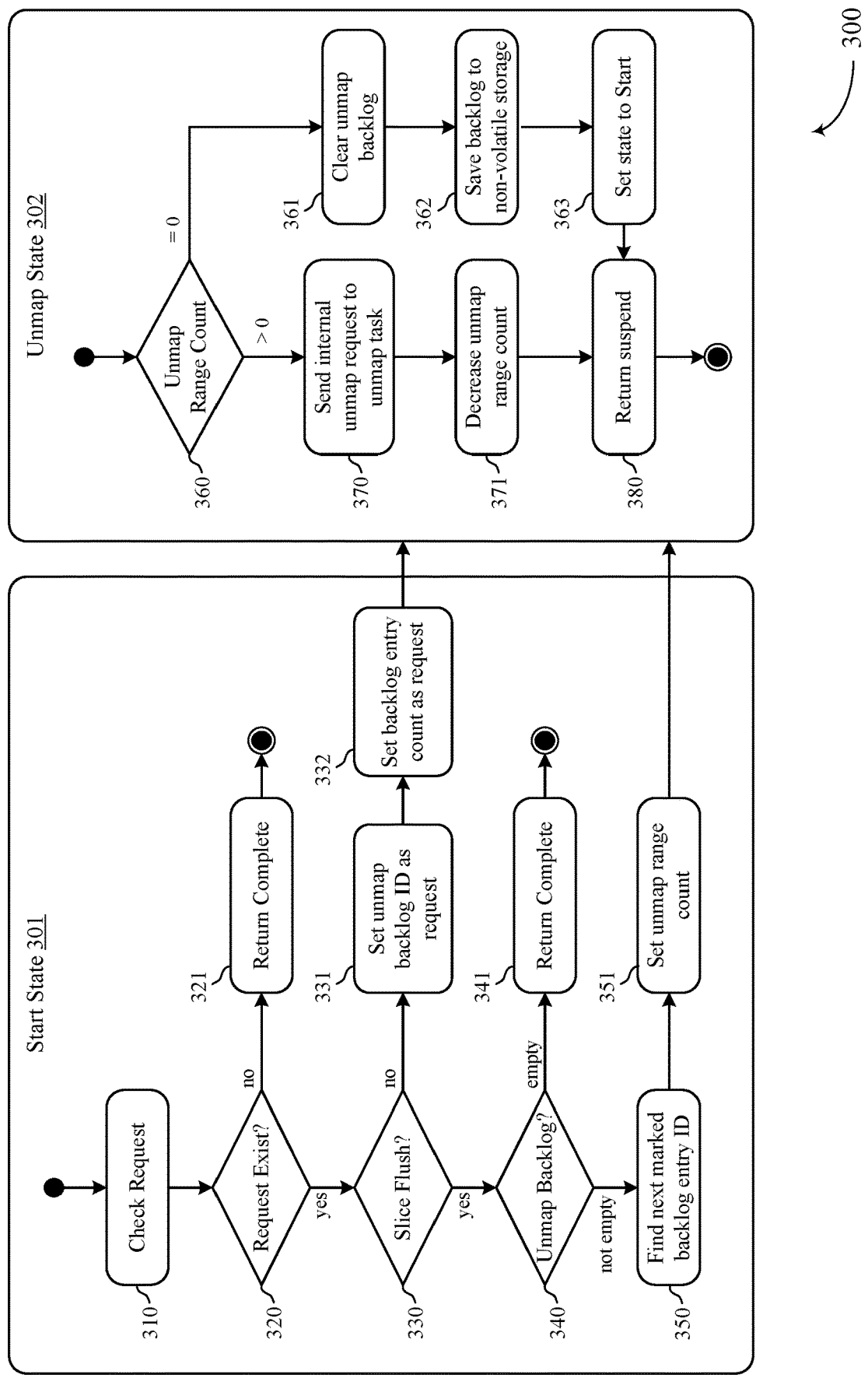
FIG. 3 illustrates an example of a state flow that supports unmap backlog in a memory system in accordance with examples as disclosed herein.

FIG. 3 illustrates an example of a state flow 300 that supports unmap backlog in a memory system in accordance with examples as disclosed herein. The state flow 300 may include operations of a start state 301 and an unmap state 302 that are supported by a memory system 110, and may illustrate aspects of an unmap backlog task, such as responding to an unmap command received from a host system 105. In some examples, one or more operations of the state flow 300 may be performed as a background operation of the memory system 110, such as operations performed during one or more idle durations of the memory system 110 (e.g., after signaling an unmap response to a host system 105).

In some examples, the state flow 300 may begin with operations of the start state 301. For example, at 310, the start state 301 may include checking for an unmap request (e.g., an unmap command from a host system 105), and, at 320, the start state 301 may include evaluating whether such a request exists. If a request does not exist, the start state 301 may proceed to 321 (e.g., a return complete transition to exit the start state 301 or return to the beginning of the start state 301), and if a request does exist, the start state 301 may proceed to 330.

At 330, the start state 301 may include evaluating whether the unmap request refers to a "slice flush," which may refer to an unmap backlog operation or unmap backlog flush that is triggered in an idle state of the memory system 110 or as some other type of background operation that may be performed opportunistically (e.g., when unmap backlog operations may be processed without impeding other higher priority operations of the memory system 110). In such examples, an unmap backlog task may choose a particular "slice" for performing backlog unmap operations, where a slice may correspond to one entry of an unmap backlog table 210 (e.g., one field 230, one section of addresses 235) or several entries (e.g., a set of two or more fields 230, a range of addresses corresponding to two or more sections of addresses 235). An alternative to a slice flush may be a "force flush," which may be triggered when an address of an access operation, such as an address of a read operation or a write operation, coincides with or is included in a section of addresses 235 having an unmap backlog indication (e.g., corresponding to a field 230 having a value of 1). If the request is associated with a slice flush, the start state 301 may proceed to 340. If the request is not associated with a slice flush (e.g., is associated with a force flush), the start state 301 may proceed to 331 to set an unmap backlog ID as the unmap request, proceed to 332 to set a backlog entry count as the unmap request, and proceed to the unmap state 302 (e.g., to perform unmap operations, to perform a forced flush to accommodate an access operation).

At 340, the start state 301 may include evaluating an unmap backlog (e.g., an unmap backlog table 210). If the unmap backlog is empty (e.g., has a value of 0 in each field 230 of the unmap backlog table 210), the start state 301 may proceed to 341 (e.g., a return complete transition to exit the start state 301 or return to the beginning of the start state 301). If the unmap backlog is not empty (e.g., has a value of 1 for one or more fields 230 of the unmap backlog table 210), the start state 301 may proceed to 350 to find a next marked backlog entry ID (e.g., a next field 230 having a value of 1, a next field 230 or section of addresses 235 associated with an address range 280, a next "slice"), proceed to 351 to set an unmap range count (e.g., to a value or count of one or to a value or count of greater than one), and proceed to the unmap state 302 (e.g., to perform unmap operations on the marked backlog entry ID).

Regarding the unmap state 302, operations may begin at 360, where the unmap state 302 may include evaluating an unmap range count. If the range count is greater than zero, the unmap state 302 may proceed to 370. At 370, the unmap state 302 may include sending an internal unmap request to an unmap task (e.g., to perform an unmapping operation on the associated addresses). The unmap state 302 may proceed to 371, which may include decreasing or decrementing an unmap range count, and the unmap state 302 may proceed to 380 as a return suspend (e.g., a transition to exit the unmap state 302 or return to the beginning of the unmap state 302).

At 360, if the range count is equal to zero, the unmap state 302 may proceed to 361, which may include clearing the unmap backlog (e.g., setting any fields 230 of an unmap backlog table 210 having a value of 1 to having a value of 0). The unmap state 302 may then proceed to 362, which may include saving the backlog to a non-volatile storage, such as saving the backlog to NAND memory cells or other memory cells of a memory device 130 or local memory 120 (e.g., flushing or saving the backlog to system information). The unmap state 302 may then proceed to 363, which may include setting the start state, and then proceed to 380 as a return suspend (e.g., to return to the beginning of the start state 301).

Figure 4:
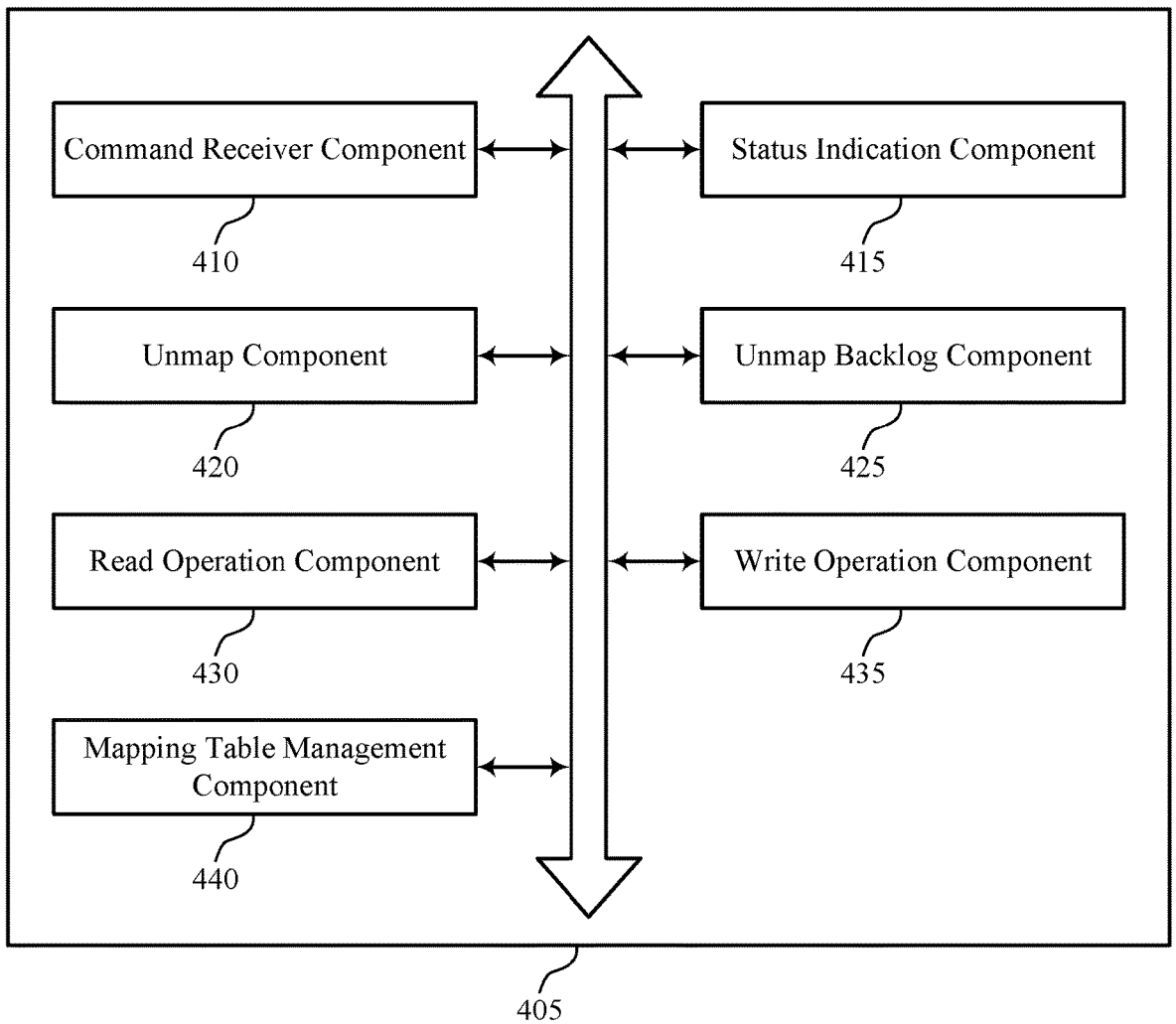
FIG. 4 shows a block diagram of a memory system that supports unmap backlog in a memory system in accordance with aspects of the present disclosure.

FIG. 4 shows a block diagram 400 of a memory system 405 that supports unmap backlog in a memory system in accordance with examples as disclosed herein. The memory system 405 may be an example of aspects of a memory system as described with reference to FIGS. 1 through 3. The memory system 405 may include a command receiver component 410, a status indication component 415, an unmap component 420, an unmap backlog component 425, a read operation component 430, a write operation component 435, and a mapping table management component 440. Each of these modules may communicate, directly or indirectly, with one another (e.g., via one or more buses).

The command receiver component 410 may receive a command from a host system to unmap a range of addresses of the memory system 405. In some examples, the command receiver component 410 may receive a read command from the host system after signaling an indication that the command to unmap the range of addresses has been processed by the memory system 405. In some examples, the command receiver component 410 may receive a write command from the host system after signaling an indication that the command to unmap the range of addresses has been processed by the memory system 405. In some examples, the command receiver component 410 may receive a second command from the host system to unmap a second range of addresses of the memory system 405.

The status indication component 415 may signal, to the host system, an indication that the command to unmap the range of addresses has been processed (e.g., handled, acknowledged) by the memory system 405. In some examples, to signal the indication that the command to unmap the range of addresses has been processed, the status indication component 415 may signal an indication that the memory system 405 is available for access by the host system. In some examples, to signal the indication that the command to unmap the range of addresses has been processed, the status indication component 415 may signal an indication that the range of addresses are available for access by the host system. In some examples, to signal the indication that the command to unmap the range of addresses has been processed, the status indication component 415 may signal an indication that an unmap operation associated with the range of addresses is being performed in a background operation.

In some examples, the status indication component 415 may signal the indication that the command to unmap the range of addresses has been processed based on setting a backlog indication for each section of one or more sections. In some examples, the status indication component 415 signaling the indication that the command to unmap the range of addresses has been processed may be based on setting a backlog indication for an identified section.

In some examples, the status indication component 415 may signal, to the host system, a second indication that a second command to unmap a second range of addresses has been processed by the memory system 405 based on setting a backlog indication for an identified section.

In some examples, the status indication component 415 may identify that a range of addresses satisfies a threshold quantity of addresses, and signal the indication that the command to unmap the range of addresses has been processed by the memory system 405 based on identifying that the range of addresses satisfies the threshold quantity of addresses.

The unmap component 420 may unmap a range of addresses of the memory system 405, which may include unmapping a portion of the range of addresses after signaling an indication that a command to unmap the range of addresses has been processed by the memory system 405. In some examples, the unmap component 420 may unmap the addresses of each section of the one or more sections, after signaling the indication, based on setting a backlog indication for each section of one or more sections.

In some examples, the unmap component 420 may unmap addresses of a section based on determining that an address of a write command is included in the section having a backlog indication.

In some examples, unmapping the range of addresses may include unmapping, before signaling an indication that the command to unmap the range of addresses has been processed by the memory system 405, one or more addresses of the identified section that are within a range of addresses. In some examples, the unmap component 420 may unmap, after signaling the indication that the command to unmap the range of addresses has been processed by the memory system 405, one or more addresses of the identified section that are within the range of addresses. In some examples, unmapping a second range of addresses may include unmapping a portion of the second range of addresses after signaling the second indication that the second command to unmap the second range of addresses has been processed.

In some examples, the unmap component 420 may assign, within a logical-to-physical mapping table of the memory system 405, an invalid entry for each address in the range of addresses of the command. In some examples, the unmap component 420 may assign the invalid entries to the logical-to-physical mapping table transferred to a second memory device of the memory system 405. In some examples, the unmap backlog component 425 may assign invalid entries to the logical-to-physical mapping table of a set of SRAM memory cells.

The unmap backlog component 425 may identify an unmap backlog table including a set of fields, each field associated with a respective section of addresses of a set of sections of addresses of the memory system 405. In some examples, the unmap backlog component 425 may determine that a portion of the range of addresses includes the addresses of one or more of the sections of the set of sections. In some examples, the unmap backlog component 425 may set a backlog indication, for each section of the one or more sections, in the respective field of the unmap backlog table. In some examples, the unmap backlog component 425 may clear the backlog indication, after unmapping the addresses of a respective section of the one or more sections, from the field of the unmap backlog table associated with the respective section.

In some examples, the unmap backlog component 425 may determine that an address of a read command is included in a section of the one or more sections having a backlog indication in the respective field of the unmap backlog table. In some examples, the unmap backlog component 425 may determine that an address of a write command is included in a section of the one or more sections having a backlog indication in the respective field of the unmap backlog table.

In some examples, the unmap backlog component 425 may identify a section of the set of sections that includes one or more addresses within the range of addresses and also includes one or more addresses not within a range. In some examples, the unmap backlog component 425 may determine that a second range of addresses includes the one or more addresses of the identified section that are not within the range.

In some examples, the unmap backlog component 425 may set a backlog indication for an identified section in the respective field of the unmap backlog table.

The read operation component 430 may respond to the host system, based on determining that the address of the read command is included in the section having the backlog indication, with a null or empty information response (e.g., a "return zero" response or other pattern indicating a null or empty response, or other response indicative of a lack of meaningful data) regardless of whether the addresses of the section have been unmapped or have not been unmapped (e.g., by the unmap component 420).

The write operation component 435 may write to a section, in accordance with the write command, after the addresses of the section have been unmapped (e.g., by the unmap component 420).

The mapping table management component 440 may load a logical-to-physical mapping table from a first memory device of the memory system 405 to a second memory device of the memory system 405. In some examples, the mapping table management component 440 may transfer the logical-to-physical table from the second memory device to the first memory device after assigning the invalid entries.

In some examples, the mapping table management component 440 may transfer the logical-to-physical mapping table from a set of NAND memory cells of the memory system 405 to a set of SRAM memory cells of the memory system 405. In some examples, the mapping table management component 440 may transfer the logical-to-physical table from the set of SRAM memory cells to the set of NAND memory cells after assigning the invalid entries.

Figure 5:
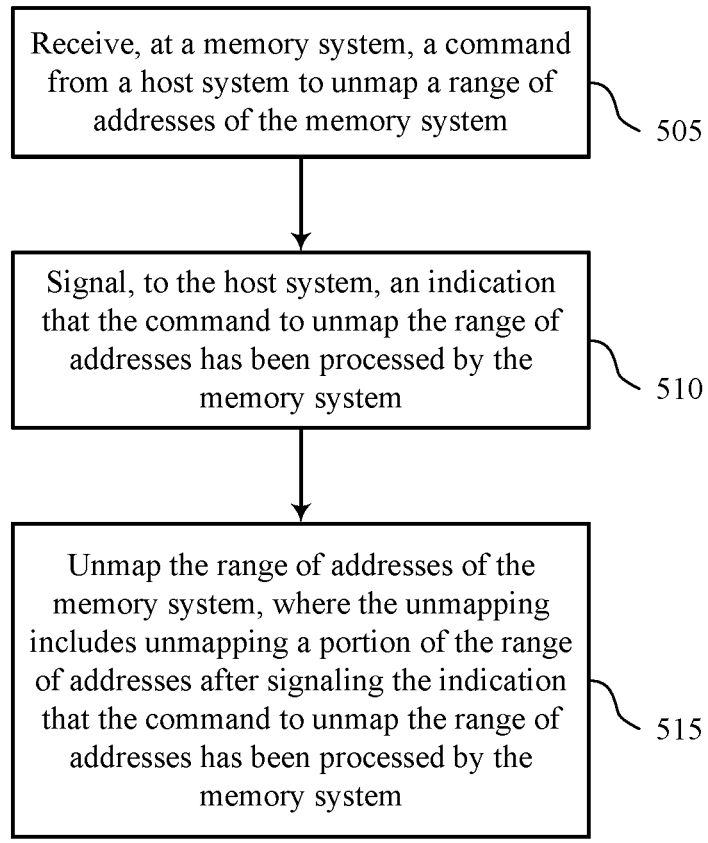
FIG. 5 shows a flowchart illustrating a method or methods that support unmap backlog in a memory system in accordance with examples as disclosed herein.

FIG. 5 shows a flowchart illustrating a method or methods 500 that supports unmap backlog in a memory system in accordance with aspects of the present disclosure. The operations of method 500 may be implemented by a memory system or its components as described herein. For example, the operations of method 500 may be performed by a memory system as described with reference to FIG. 4. In some examples, a memory system may execute a set of instructions to control the functional elements of the memory system to perform the described functions. Additionally or alternatively, a memory system may perform aspects of the described functions using special-purpose hardware.

At 505, the memory system may receive, at a memory system, a command from a host system to unmap a range of addresses of the memory system. The operations of 505 may be performed according to the methods described herein. In some examples, aspects of the operations of 505 may be performed by a command receiver component as described with reference to FIG. 4.

At 510, the memory system may signal, to the host system, an indication that the command to unmap the range of addresses has been processed by the memory system. The operations of 510 may be performed according to the methods described herein. In some examples, aspects of the operations of 510 may be performed by a status indication component as described with reference to FIG. 4.

At 515, the memory system may unmap the range of addresses of the memory system, where the unmapping includes unmapping a portion of the range of addresses after signaling the indication that the command to unmap the range of addresses has been processed by the memory system. The operations of 515 may be performed according to the methods described herein. In some examples, aspects of the operations of 515 may be performed by an unmap component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for receiving, at a memory system, a command from a host system to unmap a range of addresses of the memory system, signaling, to the host system, an indication that the command to unmap the range of addresses has been processed by the memory system, and unmapping the range of addresses of the memory system, where the unmapping includes unmapping a portion of the range of addresses after signaling the indication that the command to unmap the range of addresses has been processed by the memory system.

Some examples of the method 500 and the apparatus described herein may further include operations, features, means, or instructions for identifying an unmap backlog table including a set of fields, each field associated with a respective section of addresses of a set of sections of addresses of the memory system, determining that the portion of the range of addresses includes the addresses of one or more of the sections of the set of sections, setting a backlog indication, for each section of the one or more sections, in the respective field of the unmap backlog table, and signaling the indication that the command to unmap the range of addresses has been processed based on setting the backlog indication for each section of the one or more sections.

In some examples of the method 500 and the apparatus described herein, unmapping the range of addresses may include operations, features, means, or instructions for unmapping the addresses of each section of the one or more sections, after signaling the indication, based on setting the backlog indication for each section of the one or more sections.

Some examples of the method 500 and the apparatus described herein may further include operations, features, means, or instructions for receiving, at the memory system, a read command from the host system after signaling the indication that the command to unmap the range of addresses has been processed by the memory system, determining that an address of the read command is included in a section of the one or more sections having a backlog indication in the respective field of the unmap backlog table, and responding to the host system, based on determining that the address of the read command is included in the section having the backlog indication, with a null information or return zero response regardless of whether the addresses of the section have been unmapped or have not been unmapped.

Some examples of the method 500 and the apparatus described herein may further include operations, features, means, or instructions for receiving, at the memory system, a write command from the host system after signaling the indication that the command to unmap the range of addresses has been processed by the memory system, determining that an address of the write command is included in a section of the one or more sections having a backlog indication in the respective field of the unmap backlog table, unmapping the addresses of the section based on determining that the address of the write command is included in the section having the backlog indication, and writing to the section, in accordance with the write command, after unmapping the addresses of the section.

Some examples of the method 500 and the apparatus described herein may further include operations, features, means, or instructions for identifying a section of the set of sections that includes one or more addresses within the range of addresses and also includes one or more addresses not within the range. In some examples, unmapping the range of addresses may include unmapping, before signaling the indication that the command to unmap the range of addresses has been processed by the memory system, the one or more addresses of the identified section that are within the range of addresses.

Some examples of the method 500 and the apparatus described herein may further include operations, features, means, or instructions for identifying a section of the set of sections that includes one or more addresses within the range of addresses and also includes one or more addresses not within the range, receiving, at the memory system, a second command from the host system to unmap a second range of addresses of the memory system, determining that the second range of addresses includes the one or more addresses of the identified section that are not within the range, and setting a backlog indication for the identified section in the respective field of the unmap backlog table. In some examples, signaling the indication that the command to unmap the range of addresses has been processed may be based on setting the backlog indication for the identified section.

In some examples of the method 500 and the apparatus described herein, unmapping the range of addresses may include operations, features, means, or instructions for unmapping, after signaling the indication that the command to unmap the range of addresses has been processed by the memory system, the one or more addresses of the identified section that are within the range of addresses.

Some examples of the method 500 and the apparatus described herein may further include operations, features, means, or instructions for signaling, to the host system, a second indication that the second command to unmap the second range of addresses has been processed by the memory system based on setting the backlog indication for the identified section, and unmapping the second range of addresses of the memory system, where the unmapping the second range of addresses includes unmapping a portion of the second range of addresses after signaling the second indication that the second command to unmap the second range of addresses has been processed.

Some examples of the method 500 and the apparatus described herein may further include operations, features, means, or instructions for clearing the backlog indication, after unmapping the addresses of a respective section of the one or more sections, from the field of the unmap backlog table associated with the respective section.

Some examples of the method 500 and the apparatus described herein may further include operations, features, means, or instructions for identifying that the range of addresses satisfies a threshold quantity of addresses, where signaling the indication that the command to unmap the range of addresses has been processed by the memory system may be based on identifying that the range of addresses satisfies the threshold quantity of addresses.

In some examples of the method 500 and the apparatus described herein, unmapping the range of addresses may include operations, features, means, or instructions for assigning, within a logical-to-physical mapping table of the memory system, an invalid entry for each address in the range of addresses of the command.

In some examples of the method 500 and the apparatus described herein, unmapping the range of addresses may include operations, features, means, or instructions for loading the logical-to-physical mapping table from a first memory device of the memory system to a second memory device of the memory system, assigning the invalid entries to the logical-to-physical mapping table transferred to the second memory device, and transferring the logical-to-physical table from the second memory device to the first memory device after assigning the invalid entries.

In some examples of the method 500 and the apparatus described herein, unmapping the range of addresses may include operations, features, means, or instructions for transferring the logical-to-physical mapping table from a set of NAND memory cells of the memory system to a set of SRAM memory cells of the memory system, assigning the invalid entries to the logical-to-physical mapping table of the set of SRAM memory cells, and transferring the logical-to-physical table from the set of SRAM memory cells to the set of NAND memory cells after assigning the invalid entries.

In some examples of the method 500 and the apparatus described herein, signaling the indication that the command to unmap the range of addresses has been processed may include operations, features, means, or instructions for signaling an indication that the memory system is available for access by the host system.

In some examples of the method 500 and the apparatus described herein, signaling the indication that the command to unmap the range of addresses has been processed may include operations, features, means, or instructions for signaling an indication that the range of addresses is available for access by the host system.

In some examples of the method 500 and the apparatus described herein, signaling the indication that the command to unmap the range of addresses has been processed may include operations, features, means, or instructions for signaling an indication that an unmap operation associated with the range of addresses is being performed in a background operation.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory array and a controller coupled with the memory array. The controller may be configured to cause the apparatus to receive a command from a host system to unmap a range of addresses of the memory array, signal, to the host system, an indication that the command to unmap the range of addresses has been processed by the apparatus, and unmap the range of addresses. In some examples, the unmapping may include unmapping a portion of the range of addresses after signaling the indication that the command to unmap the range of addresses has been processed by the apparatus.

In some examples, the controller may be configured to cause the apparatus to identify an unmap backlog table including a set of fields, each field associated with a respective section of addresses of a set of sections of addresses of the memory array, determine that the portion of the range of addresses includes the addresses of one or more of the sections of the set of sections, set a backlog indication, for each section of the one or more sections, in the respective field of the unmap backlog table, and signal the indication that the command to unmap the range of addresses has been processed based on setting the backlog indication for each section of the one or more sections.

In some examples, to unmap the range of addresses, the controller may be configured to cause the apparatus to unmap the addresses of each section of the one or more sections, after signaling the indication, based on setting the backlog indication for each section of the one or more sections.

In some examples, the controller may be configured to cause the apparatus to receive a read command from the host system after signaling the indication that the command to unmap the range of addresses has been processed by the apparatus, determine that an address of the read command is included in a section of the one or more sections having a backlog indication in the respective field of the unmap backlog table, and respond to the host system, based on determining that the address of the read command is included in the section having the backlog indication, with a return zero or other null or empty information response regardless of whether the addresses of the section has been unmapped or has not been unmapped.

In some examples, the controller may be configured to cause the apparatus to receive a write command from the host system after signaling the indication that the command to unmap the range of addresses has been processed by the apparatus, determine that an address of the write command is included in a section of the one or more sections having a backlog indication in the respective field of the unmap backlog table, unmap the addresses of the section based on determining that the address of the write command is included in the section having the backlog indication, and write to the section, in accordance with the write command, after unmapping the addresses of the section.

In some examples, the controller may be configured to cause the apparatus to identify a section of the set of sections that includes one or more addresses within the range of addresses and also includes one or more addresses not within the range, and, to unmap the range of addresses, the controller may be configured to cause the apparatus to unmap, before signaling the indication that the command to unmap the range of addresses has been processed by the apparatus, the one or more addresses of the identified section that are within the range of addresses.

In some examples, the controller may be configured to cause the apparatus to identify a section of the set of sections that includes one or more addresses within the range of addresses and also includes one or more addresses not within the range, receive a second command from the host system to unmap a second range of addresses of the memory array, determine that the second range of addresses includes the one or more addresses of the identified section that are not within the range, and set a backlog indication for the identified section in the respective field of the unmap backlog table. In some examples, the configuration to signal the indication that the command to unmap the range of addresses has been processed may be operable based on setting the backlog indication for the identified section.

In some examples, to unmap the range of addresses, the controller may be configured to cause the apparatus to unmap, after signaling the indication that the command to unmap the range of addresses may have been processed by the apparatus, the one or more addresses of the identified section that may be within the range of addresses.

In some examples, the controller may be configured to cause the apparatus to signal, to the host system, a second indication that the second command to unmap the second range of addresses has been processed by the apparatus based on setting the backlog indication for the identified section, and unmap the second range of addresses of the memory array. In some examples, unmapping the second range of addresses may include unmapping a portion of the second range of addresses after signaling the second indication that the second command to unmap the second range of addresses has been processed.

In some examples, the controller may be configured to cause the apparatus to clear the backlog indication, after unmapping the addresses of a respective section of the one or more sections, from the field of the unmap backlog table associated with the respective section.

In some examples, the controller may be configured to cause the apparatus to identify that the range of addresses satisfies a threshold quantity of addresses, and signaling the indication that the command to unmap the range of addresses has been processed by the apparatus may be based on identifying that the range of addresses satisfies the threshold quantity of addresses.

In some examples, to unmap the range of addresses, the controller may be configured to cause the apparatus to assign, within a logical-to-physical mapping table of the apparatus, an invalid entry for each address in the range of addresses of the command.

In some examples, to unmap the range of addresses, the controller may be configured to cause the apparatus to load the logical-to-physical mapping table from a first memory device of the apparatus to a second memory device of the apparatus, assign the invalid entries to the logical-to-physical mapping table transferred to the second memory device, and transfer the logical-to-physical mapping table from the second memory device to the first memory device after assigning the invalid entries.

In some examples, to unmap the range of addresses, the controller may be configured to cause the apparatus to transfer the logical-to-physical mapping table from a set of NAND memory cells of the apparatus to a set of SRAM memory cells of the apparatus, assign the invalid entries to the logical-to-physical mapping table of the set of SRAM memory cells, and transfer the logical-to-physical mapping table from the set of SRAM memory cells to the set of NAND memory cells after assigning the invalid entries.

In some examples, to signal the indication that the command to unmap the range of addresses has been processed, the controller may be configured to cause the apparatus to signal an indication that the apparatus is available for access by the host system.

In some examples, to signal the indication that the command to unmap the range of addresses has been processed, the controller may be configured to cause the apparatus to signal an indication that the range of addresses is available for access by the host system.

In some examples, to signal the indication that the command to unmap the range of addresses has been processed, the controller may be configured to cause the apparatus to signal an indication that an unmap operation associated with the range of addresses is being performed in a background operation.

A non-transitory computer-readable medium is described. The non-transitory computer-readable medium may store code including instructions which, when executed by a processor of an electronic device, cause the electronic device to receive a command from a host system to unmap a range of addresses of a memory system, signal, to the host system, an indication that the command to unmap the range of addresses has been processed by the electronic device, and unmap the range of addresses of the memory system. In some examples, the unmapping includes unmapping a portion of the range of addresses after signaling the indication that the command to unmap the range of addresses has been processed by the electronic device.

In some examples of the non-transitory computer-readable medium, the instructions, when executed by the processor of the electronic device, may further cause the electronic device to identify an unmap backlog table comprising a plurality of fields, each field associated with a respective section of addresses of a plurality of sections of addresses of the memory system, determine that the portion of the range of addresses includes the addresses of one or more of the sections of the plurality of sections, set a backlog indication, for each section of the one or more sections, in the respective field of the unmap backlog table, and signal the indication that the command to unmap the range of addresses has been processed based at least in part on setting the backlog indication for each section of the one or more sections.

In some examples of the non-transitory computer-readable medium, the instructions to unmap the range of addresses, when executed by the processor of the electronic device, may further cause the electronic device to unmap the addresses of each section of the one or more sections, after signaling the indication, based at least in part on setting the backlog indication for each section of the one or more sections.

In some examples of the non-transitory computer-readable medium, the instructions, when executed by the processor of the electronic device, may further cause the electronic device to receive a read command from the host system after signaling the indication that the command to unmap the range of addresses has been processed by the electronic device, determine that an address of the read command is included in a section of the one or more sections having a backlog indication in the respective field of the unmap backlog table, and respond to the host system, based at least in part on determining that the address of the read command is included in the section having the backlog indication, with a return zero response regardless of whether the addresses of the section have been unmapped or have not been unmapped.

In some examples of the non-transitory computer-readable medium, the instructions, when executed by the processor of the electronic device, may further cause the electronic device to receive a write command from the host system after signaling the indication that the command to unmap the range of addresses has been processed by the electronic device, determine that an address of the write command is included in a section of the one or more sections having a backlog indication in the respective field of the unmap backlog table, unmap the addresses of the section based at least in part on determining that the address of the write command is included in the section having the backlog indication, and write to the section, in accordance with the write command, after unmapping the addresses of the section.

In some examples of the non-transitory computer-readable medium, the instructions, when executed by the processor of the electronic device, may further cause the electronic device to identify a section of the plurality of sections that includes one or more addresses within the range of addresses and also includes one or more addresses not within the range. In some examples, the instructions to unmap the range of addresses, when executed by the processor of the electronic device, may cause the electronic device to unmap, before signaling the indication that the command to unmap the range of addresses has been processed by the electronic device, the one or more addresses of the identified section that are within the range of addresses.

In some examples of the non-transitory computer-readable medium, the instructions, when executed by the processor of the electronic device, may further cause the electronic device to identify a section of the plurality of sections that includes one or more addresses within the range of addresses and also includes one or more addresses not within the range, receive a second command from the host system to unmap a second range of addresses of the memory system, determine that the second range of addresses includes the one or more addresses of the identified section that are not within the range, and set a backlog indication for the identified section in the respective field of the unmap backlog table. In some examples, the instructions to signal the indication that the command to unmap the range of addresses has been processed may be operable based at least in part on setting the backlog indication for the identified section.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
receive a command to unmap a range of addresses of the one or more memory devices;
signal, based at least in part on the range of addresses satisfying a threshold quantity of addresses, an indication that the command to unmap the range of addresses has been processed by the memory system; and
unmap the range of addresses, wherein the unmapping comprises unmapping a portion of the range of addresses after signaling the indication that the command to unmap the range of addresses has been processed by the memory system.

2. The memory system of claim 1, wherein, to unmap the range of addresses, the processing circuitry is configured to cause the memory system to:
assign, within a logical-to-physical mapping table of the memory system, an invalid entry for each address in the range of addresses of the command.

3. The memory system of claim 1, wherein, to signal the indication that the command to unmap the range of addresses has been processed, the processing circuitry is configured to cause the memory system to:
signal an indication that the memory system is available for access.

4. The apparatus memory system of claim 1, wherein, to signal the indication that the command to unmap the range of addresses has been processed, the processing circuitry is configured to cause the memory system to:
signal an indication that the range of addresses are available for access.

5. The memory system of claim 1, wherein, to signal the indication that the command to unmap the range of addresses has been processed, the processing circuitry is configured to cause the memory system to:
signal an indication that an unmap operation associated with the range of addresses is being performed in a background operation.

6. An memory system, comprising:
one or more memory devices; and
processing circuitry coupled with the one or more memory devices and configured to cause the memory system to:
receive a command to unmap a range of addresses of the one or more memory devices;
identify an unmap backlog table comprising a plurality of fields, each field associated with a respective section of addresses of a plurality of sections of addresses of the one or more memory devices;
determine that the range of addresses includes the addresses of one or more sections of the plurality of sections;
set a backlog indication, for each section of the one or more sections, in corresponding one or more fields of the plurality of fields of the unmap backlog table;
signal an indication that the command to unmap the range of addresses has been processed by the memory system based at least in part on setting the backlog indication for each section of the one or more sections; and
unmap the range of addresses, wherein the unmapping comprises unmapping a portion of the range of addresses after signaling the indication that the command to unmap the range of addresses has been processed by the memory system.

7. The memory system of claim 6, wherein, to unmap the range of addresses, the processing circuitry is configured to cause the memory system to:
unmap the addresses of each section of the one or more sections, after signaling the indication, based at least in part on setting the backlog indication for each section of the one or more sections.

8. The memory system of claim 6, wherein the processing circuitry is further configured to cause the memory system to:
receive a read command after signaling the indication that the command to unmap the range of addresses has been processed by the memory system;
determine that an address of the read command is included in a section of the one or more sections having the backlog indication in the corresponding one or more fields of the unmap backlog table; and
respond, based at least in part on determining that the address of the read command is included in the section having the backlog indication, with a return zero response regardless of whether the addresses of the section have been unmapped or have not been unmapped.

9. The memory system of claim 6, wherein the processing circuitry is further configured to cause the memory system to:
receive a write command after signaling the indication that the command to unmap the range of addresses has been processed by the memory system;
determine that an address of the write command is included in a section of the one or more sections having the backlog indication in the corresponding one or more fields of the unmap backlog table;

unmap the addresses of the section based at least in part on determining that the address of the write command is included in the section having the backlog indication; and
write to the section, in accordance with the write command, after unmapping the addresses of the section.

10. The memory system of claim 6, wherein the processing circuitry is further configured to cause the memory system to:
identify a section of the plurality of sections that includes one or more addresses within the range of addresses and also includes one or more addresses not within the range,
wherein, to unmap the range of addresses, the processing circuitry is configured to cause the memory system to unmap, before signaling the indication that the command to unmap the range of addresses has been processed by the memory system, the one or more addresses of the identified section that are within the range of addresses.

11. The memory system of claim 6, wherein the processing circuitry is further configured to cause the memory system to:
identify a section of the plurality of sections that includes one or more addresses within the range of addresses and also includes one or more addresses not within the range;
receive a second command to unmap a second range of addresses of the one or more memory devices;
determine that the second range of addresses includes the one or more addresses of the identified section that are not within the range; and
set the backlog indication for the identified section in a corresponding field of the unmap backlog table,
wherein the configuration to signal the indication that the command to unmap the range of addresses has been processed is operable based at least in part on setting the backlog indication for the identified section.

12. The memory system of claim 11, wherein, to unmap the range of addresses, the processing circuitry is configured to cause the memory system to:
unmap, after signaling the indication that the command to unmap the range of addresses has been processed by the memory system, the one or more addresses of the identified section that are within the range of addresses.

13. The memory system of claim 11, wherein the processing circuitry is further configured to cause the memory system to:
signal a second indication that the second command to unmap the second range of addresses has been processed by the memory system based at least in part on setting the backlog indication for the identified section; and
unmap the second range of addresses of the one or more memory devices, wherein the unmapping the second range of addresses comprises unmapping a portion of the second range of addresses after signaling the second indication that the second command to unmap the second range of addresses has been processed.

14. The memory system of claim 6, wherein the processing circuitry is further configured to cause the memory system to:
clear the backlog indication, after unmapping the addresses of a respective section of the one or more sections, from a corresponding field of the unmap backlog table associated with the respective section.

15. The memory system of claim 6, wherein the processing circuitry is further configured to cause the memory system to:
identify that the range of addresses satisfies a threshold quantity of addresses, wherein signaling the indication that the command to unmap the range of addresses has been processed by the memory system is based at least in part on identifying that the range of addresses satisfies the threshold quantity of addresses.

16. A memory system, comprising:
one or more memory devices; and
processing circuitry coupled with the one or more memory devices and configured to cause the memory system to:
receive a command to unmap a range of addresses of the one or more memory devices;
signal an indication that the command to unmap the range of addresses has been processed by the memory system; and
unmap the range of addresses, wherein the unmapping comprises unmapping a portion of the range of addresses after signaling the indication that the command to unmap the range of addresses has been processed by the memory system and wherein, to unmap the range of addresses, the processing circuitry is configured to cause the memory system to:
load a logical-to-physical mapping table from a first memory device of the one or more memory devices to a second memory device of the one or more memory devices;
assign an invalid entry for each address in the range of addresses of the command to the logical-to-physical mapping table transferred to the second memory device; and
transfer the logical-to-physical mapping table from the second memory device to the first memory device after assigning the invalid entries.

17. A memory system, comprising:
one or more memory devices; and
processing circuitry coupled with the one or more memory devices and configured to cause the memory system to:
receive a command to unmap a range of addresses of the one or more memory devices;
signal an indication that the command to unmap the range of addresses has been processed by the memory system; and
unmap the range of addresses, wherein the unmapping comprises unmapping a portion of the range of addresses after signaling the indication that the command to unmap the range of addresses has been processed by the memory system and wherein, to unmap the range of addresses, the processing circuitry is configured to cause the memory system to:
transfer a logical-to-physical mapping table from a set of NAND memory cells of the memory system to a set of static random access memory (SRAM) memory cells of the memory system;
assign an invalid entry for each address in the range of addresses of the command to the logical-to-physical mapping table of the set of SRAM memory cells; and
transfer the logical-to-physical mapping table from the set of SRAM memory cells to the set of NAND memory cells after assigning the invalid entries.

18. A non-transitory computer-readable medium storing code comprising instructions which, when executed by processing circuitry of an electronic device, cause the electronic device to:
- receive a command to unmap a range of addresses of one or more memory devices of the electronic device;
- signal, based at least in part on the range of addresses satisfying a threshold quantity of addresses, an indication that the command to unmap the range of addresses has been processed by the electronic device; and
- unmap the range of addresses of the one or more memory devices of the electronic device, wherein the unmapping comprises unmapping a portion of the range of addresses after signaling the indication that the command to unmap the range of addresses has been processed by the electronic device.

19. A non-transitory computer-readable medium storing code comprising instructions which, when executed by processing circuitry of an electronic device, cause the electronic device to:
- receive a command to unmap a range of addresses of one or more memory devices of the electronic device;
- identify an unmap backlog table comprising a plurality of fields, each field associated with a respective section of addresses of a plurality of sections of addresses of the one or more memory devices;
- determine that the range of addresses includes the addresses of one or more sections of the plurality of sections;
- set a backlog indication, for each section of the one or more sections, in corresponding one or more fields of the plurality of fields of the unmap backlog table;
- signal an indication that the command to unmap the range of addresses has been processed by the electronic device based at least in part on setting the backlog indication for each section of the one or more sections; and
- unmap the range of addresses, wherein the unmapping comprises unmapping a portion of the range of addresses after signaling the indication that the command to unmap the range of addresses has been processed by the electronic device.

20. The non-transitory computer-readable medium of claim 19, wherein the instructions to unmap the range of addresses, when executed by the processing circuitry of the electronic device, cause the electronic device to:
- unmap the addresses of each section of the one or more sections, after signaling the indication, based at least in part on setting the backlog indication for each section of the one or more sections.

21. The non-transitory computer-readable medium of claim 19, wherein the instructions, when executed by the processing circuitry of the electronic device, further cause the electronic device to:
- receive a read command after signaling the indication that the command to unmap the range of addresses has been processed by the electronic device;
- determine that an address of the read command is included in a section of the one or more sections having the backlog indication in the corresponding one or more fields of the unmap backlog table; and
- respond, based at least in part on determining that the address of the read command is included in the section having the backlog indication, with a return zero response regardless of whether the addresses of the section have been unmapped or have not been unmapped.

22. The non-transitory computer-readable medium of claim 19, wherein the instructions, when executed by the processing circuitry of the electronic device, further cause the electronic device to:
- receive a write command after signaling the indication that the command to unmap the range of addresses has been processed by the electronic device;
- determine that an address of the write command is included in a section of the one or more sections having the backlog indication in the corresponding one or more fields of the unmap backlog table;
- unmap the addresses of the section based at least in part on determining that the address of the write command is included in the section having the backlog indication; and
- write to the section, in accordance with the write command, after unmapping the addresses of the section.

23. The non-transitory computer-readable medium of claim 19, wherein the instructions, when executed by the processing circuitry of the electronic device, further cause the electronic device to:
- identify a section of the plurality of sections that includes one or more addresses within the range of addresses and also includes one or more addresses not within the range,
- wherein the instructions to unmap the range of addresses, when executed by the processing circuitry of the electronic device, cause the electronic device to unmap, before signaling the indication that the command to unmap the range of addresses has been processed by the electronic device, the one or more addresses of the identified section that are within the range of addresses.

24. The non-transitory computer-readable medium of claim 19, wherein the instructions, when executed by the processing circuitry of the electronic device, further cause the electronic device to:
- identify a section of the plurality of sections that includes one or more addresses within the range of addresses and also includes one or more addresses not within the range;
- receive a second command to unmap a second range of addresses of the one or more memory devices;
- determine that the second range of addresses includes the one or more addresses of the identified section that are not within the range; and
- set the backlog indication for the identified section in a respective field of the unmap backlog table,
- wherein the instructions to signal the indication that the command to unmap the range of addresses has been processed are operable based at least in part on setting the backlog indication for the identified section.

25. A method, comprising:
- receiving, at a memory system, a command to unmap a range of addresses of one or more memory devices of the memory system;
- signaling, based at least in part on the range of addresses satisfying a threshold quantity of addresses, an indication that the command to unmap the range of addresses has been processed by the memory system; and
- unmapping the range of addresses of the one or more memory devices of the memory system, wherein the unmapping comprises unmapping a portion of the range of addresses after signaling the indication that the command to unmap the range of addresses has been processed by the memory system.

* * * * *